United States Patent
Daniels

[15] 3,693,150
[45] Sept. 19, 1972

[54] VEHICLE WINDOW ACTUATED ALARM DEVICE

[72] Inventor: Edward N. Daniels, 1961 Delaware St., Gary, Ind. 46407

[22] Filed: June 3, 1971

[21] Appl. No.: 149,550

[52] U.S. Cl. ............................. 340/63, 200/61.44
[51] Int. Cl. .................................... B60r 25/10
[58] Field of Search ............... 340/63, 64, 274, 276; 200/61.44

[56] References Cited

UNITED STATES PATENTS

| | | | |
|---|---|---|---|
| 2,521,858 | 9/1950 | Levy | 340/274 X |
| 2,840,654 | 6/1958 | Halpern | 200/61.8 |
| 3,310,775 | 3/1967 | Birth | 340/63 |

Primary Examiner—Alvin M. Waring
Attorney—Mc Dougall, Hersh & Scott

[57] ABSTRACT

An alarm device for mounting on vehicles comprising a switch and a plunger biased away from the switch, and an arm having the configuration of a backward S with the arm being pivotally mounted adjacent to the window of the vehicle, and the upper portion of the arm operatively engaged with the plunger and a lower portion being in abutting relationship with the window whereby the arm maintains the plunger in a depressed position when the window is closed and which is caused to pivot toward the window to release the plunger when the window is displaced from a closed position.

4 Claims, 3 Drawing Figures

PATENTED SEP 19 1972　　　　　　　　　　　　　　3,693,150

INVENTOR
Edward N. Daniels
by McDougall, Hersh
　　and Scott
　　　　　　Att'ys

VEHICLE WINDOW ACTUATED ALARM DEVICE

This invention relates to alarm devices, and more particularly for alarm devices for use with automobiles and the like to prevent unauthorized entry.

A wide variety of alarm devices have been proposed for use with automobiles and the like to prevent unauthorized entry of same. The majority of automobile alarms in use make use of a switching device which is responsive to the opening of a door to actuate the alarm. As a result, such alarm devices suffer from numerous disadvantages.

The most significant disadvantage of such alarm devices stems from the fact that, since the alarm is actuated in response to the opening of a door, they are incapable of detecting an entry made to the vehicle by breaking a window or by opening a window and crawling through the open window. Such alarm devices are insensitive to the opening of a window in the vehicle.

It is accordingly an object of the present invention to provide a new and improved alarm device which overcomes the foregoing disadvantages, and it is a related object of the invention to provide an alarm device for use with automobiles and like vehicles which is sensitive to the breaking or opening of a window in the vehicle.

It is a more specific object of the invention to provide an alarm device of the type described which is actuated in response to the displacement of a door window from a normally closed position and which does not interfere with the opening or closing of the window.

These and other objects and advantages will more fully appear hereinafter, and, for purposes of illustration, but not of limitation, an embodiment of the invention is shown in the accompanying drawing in which.

The concepts of the present invention reside in an alarm device for use with automobiles and like vehicles comprising a spring-biased plunger switch adapted to be mounted adjacent to the window of an automobile door or the like and a pivotally mounted arm having one end in pressure engagement with the plunger of the switch and the other end in contact with the window in the door when the window is in a closed position whereby the opening of the door and/or the displacement of the window, either by breaking or by opening, causes the arm to be pivoted outwardly to release the pressure on the switch and actuate the alarm. Thus, the alarm device of the present invention is sensitive not only to the opening of a door of the protected vehicle, but also to the unauthorized opening or breaking of a window in the vehicle.

Figure 1:
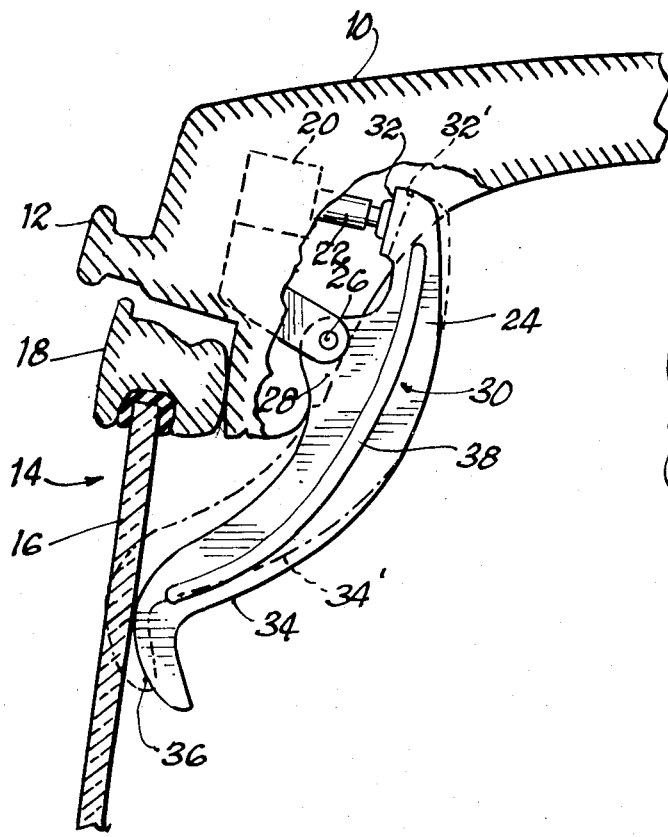
FIG. 1 is a side view of the actuating mechanism of the alarm device of the invention.

Referring now to the drawings, there is shown in FIG. 1 an alarm device embodying the features of this invention mounted on an automobile. As shown in this figure, the device is mounted near the roof 10 having a conventional gutter and adjacent to a door 14 comprising a window 16 and a frame 18. However, as will be appreciated by those skilled in the art, the frame portion 18 of the door can be a rubber sealing member if the automobile provided with the alarm device is a "hard top" having no door posts.

The alarm device of the present invention includes a plunger-type switch formed of a switch 20 and plunger 22 which is biased outwardly from the switch when no pressure is applied to the plunger. The plunger 22 is operatively engaged with the window 16 by means of an arm 24 having the configuration of a backward S. The arm is pivotally mounted on a pin or the like at an intermediate portion 28, and the upper portion 30 is in contact with plunger 22. For this purpose, it is generally referred that the upper portion 30 be formed of a relatively flat end surface to facilitate contact of the arm 24 with the plunger.

The lower portion 34 of the arm 24 abuts against the interior surface of window 16 when the window 16 is in a closed position as shown in FIG. 1 whereby the window 16 causes the arm 24 to be pivoted about pin 26 to cause surface 32 to exert a pressure on plunger 22 to depress the plunger. Since plunger 22 is biased outwardly, the opening or breaking of window 16, or the opening of door 14 results in the pivoting of arm 24 in the opposite direction to the position shown in dotted lines in FIG. 1 such that the lower portion of the arm is displaced outwardly to release the pressure on plunger 22 and thereby actuate an alarm.

An important feature of the invention resides in the fact that the lower portion of the arm 34 is provided with a surface 36 which is normally in contact with the window when the window and door are in a closed position which is curved in a direction downwardly and away from the window. In this way, the window 16 can be rolled down (when the alarm is inactivated as hereinafter described) and then rolled up without the necessity of having to reset the arm 24 since the curved portion is pressed inwardly as the window 16 is returned to the closed position.

Figure 2:
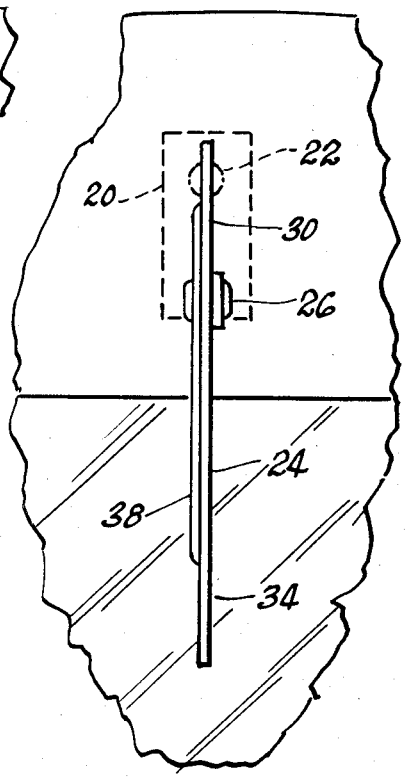
FIG. 2 is a front view of the actuating mechanism shown in FIG. 1.

FIG. 2 illustrates a front view of the device shown in FIG. 1. As can be seen in this figure, the arm 24 can be formed of a rigid plate having the configuration described, either with or without one or more reinforcing ribs 38 to the desired rigidity. The switch 20 with its associated plunger 22 can conveniently be mounted on the roof rail or the finish molding in any desired manner.

Figure 3:
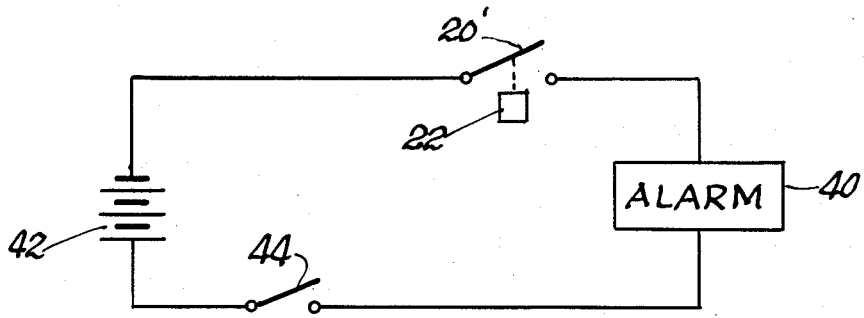
FIG. 3 is a schematic view of the actuating mechanism with an alarm.

The alarm device illustrated in FIGS. 1 and 2 can be used in combination with any of a variety of means to generate an audible or like signal such as a bell, siren, auto horn or the like. One suitable arrangement is schematically illustrated in FIG. 3 of the drawing where the switch 20' is shown as closing in response to release of the plunger. The switch 20', which corresponds to switch 20 of FIG. 1, is connected in series with a signal generator 40, a suitable power supply 42 such as the battery in the automobile protected by the alarm and a simple "on-off" switch 44 which enables the entire system to be inactivated while the automobile or the like is in use so that entry to or exit from the automobile will not actuate the alarm.

Thus, in use, the "on-off" switch 44 (which may be located outside the vehicle as desired) is closed to activate the system. As long as the window 16 and door 14 are in their normally closed positions, the plunger 22 is remained in a depressed position, thereby maintaining switch 20 open. However, if the door 14 and/or the window 16 are opened without first deactivating the system by opening the "on-off" switch 44, the displacement of the window enables the lower portion 34 of arm 24 to be pivoted in a clockwise direction in FIG. 1 under the pressure exerted by the spring bias of plunger 22, which in turn results in the release of plunger 22 to closed switch 20. When switch 20 is closed, the alarm 40 is energized to send off a signal, preferably an audible signal.

As will be appreciated by those skilled in the art, more than one switch and associated arm can be incorporated into the system as desired. For example, it is possible and frequently desirable to provide an assembly of the type illustrated in FIGS. 1 and 2 for each door of the vehicle whereby the alarm 40 is energized if any one of the doors is opened.

It will be apparent that I have provided an improved alarm device for use with automobiles and the like having greater sensitivity and which can be manufactured and installed in a simple and economical manner. The alarm of this invention, when used alone but in combination with alarm systems which protect the two or four doors and/or the hoods and deck lids of automobiles, is capable of overcoming the present disadvantages of automobile alarm systems currently in use. The alarm device of the present invention can be installed, either alone or in combination with other alarm systems to protect the doors and hoods and deck lids on an automobile assembly line, thereby resulting in low installation costs as well as reductions in auto insurance rates and auto thefts.

It will be understood that various changes and modifications made be made in the details of construction and use without departing from the spirit of the invention, especially as defined in the following claims.

I claim:

1. An alarm device for mounting adjacent the window of vehicles comprising a switch, a plunger biased away from the switch and an arm having the configuration of a backward S, said arm being pivotally mounted at an intermediate portion and having an upper surface in operative pressure engagement with the plunger and a lower surface adapted to abut a window of the vehicle when the window is in a closed position, said lower surface being curved downwardly and inwardly away from the window, whereby the arm maintains the plunger in a depressed position when the window is in a normally closed position and is caused to pivot toward the window to release the plunger when the window is displaced from the closed position.

2. A device as defined in claim 1 wherein the upper portion of the arm is formed with a substantially flat surface.

3. A device as defined in claim 1 which includes means to generate a signal in response to release of the plunger from a depressed position, and power supply means to energize the means to generate the signal.

4. A device as defined in claim 3 which includes a second switch means to deactivate the means to generate a signal.

* * * * *